United States Patent [19]

Harmon

[11] Patent Number: 5,394,713
[45] Date of Patent: * Mar. 7, 1995

[54] LOCKING DEVICES FOR FLOPPY DISK DRIVES

[75] Inventor: Thomas J. Harmon, Bel Air, Md.

[73] Assignee: Leonard Bloom, Towson, Md. ; a part interest

[ * ] Notice: The portion of the term of this patent subsequent to Feb. 21, 2012 has been disclaimed.

[21] Appl. No.: 102,430

[22] Filed: Aug. 5, 1993

Related U.S. Application Data

[63] Continuation-in-part of Ser. No. 60,608, May 11, 1993.

[51] Int. Cl.$^6$ ............................................. E05B 73/00
[52] U.S. Cl. .......................................... 70/58; 70/163; 70/164
[58] Field of Search .................... 70/14, 58, 54–56, 70/158, 163, 164, 423, 424; 16/DIG. 33; 360/137

[56] References Cited

U.S. PATENT DOCUMENTS

| 87,645 | 3/1869 | Dante | 70/424 |
|---|---|---|---|
| 934,928 | 9/1909 | Michel | 70/423 |
| 1,612,656 | 12/1926 | Levy | 16/DIG. 33 X |
| 2,383,397 | 8/1945 | Lofqwist | 70/424 |
| 4,085,599 | 4/1978 | Fischer et al. | 70/DIG. 63 X |
| 4,527,405 | 7/1985 | Renick et al. | 70/14 |
| 4,680,949 | 7/1987 | Stewart | 70/58 X |
| 4,887,951 | 12/1989 | Hashimoto | 411/542 X |
| 4,924,683 | 5/1990 | Derman | 70/58 X |
| 4,964,286 | 10/1990 | Poyer | 70/58 |
| 5,109,683 | 5/1992 | Cartwright | 70/58 X |
| 5,189,582 | 2/1993 | Hanson et al. | 360/132 |

FOREIGN PATENT DOCUMENTS

| 1085107 | 1/1955 | France | 70/14 |
|---|---|---|---|
| 2824796 | 12/1978 | Germany | |
| 14095 | 5/1905 | Norway | 70/424 |
| WO85/05725 | 12/1985 | WIPO | 70/58 |

OTHER PUBLICATIONS

IBM Technical Disclosure Bulletin: Lock for Magnetic Disk Drive Units, vol. 15, No. 9, Feb. 1973.
IBM Technical Disclosure Bulletin: Security Locks for Diskett Drives, vol. 28, No. 2, Jul. 1985.
IBM Technical Disclosure Bulletin: Security Device for a Disk Drive, vol. 30, No. 8, Jan. 1988.
Photocopy of packaging for "File Lok I.".
Photocopy of packaging for "File Lok II."

Primary Examiner—Lloyd A. Gall
Attorney, Agent, or Firm—Leonard Bloom

[57] ABSTRACT

Locking devices (10, 10', 10") are inserted within the disk drive (11) of a personal computer ("PC") 12 to prevent unauthorized use thereof. The locking devices (10, 10', 10") include a pair of pivoted plates (15) retained in their expanded position within the disk drive (11) by means of an externally-accessible padlock (20) or its equivalent. In one embodiment, the locking device (10) has respective pairs of pins (21, 22) which sandwich the front cover (13) of the disk drive (11). In another embodiment, the locking device (10') has respective teeth (25) which frictionally engage the respective spaced-apart side rails (26) of the disk drive (11). In yet another embodiment, the locking device (10") has both pins (21, 22) and teeth (25) and is provided with a torsion spring (30) constantly biasing the plates (15) into their expanded position.

15 Claims, 12 Drawing Sheets

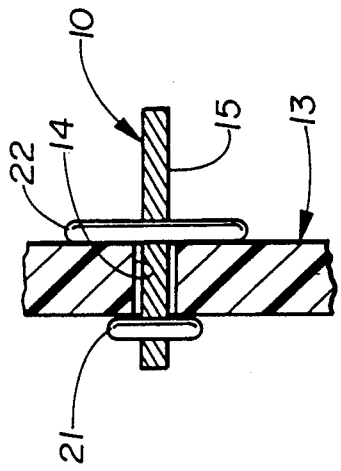
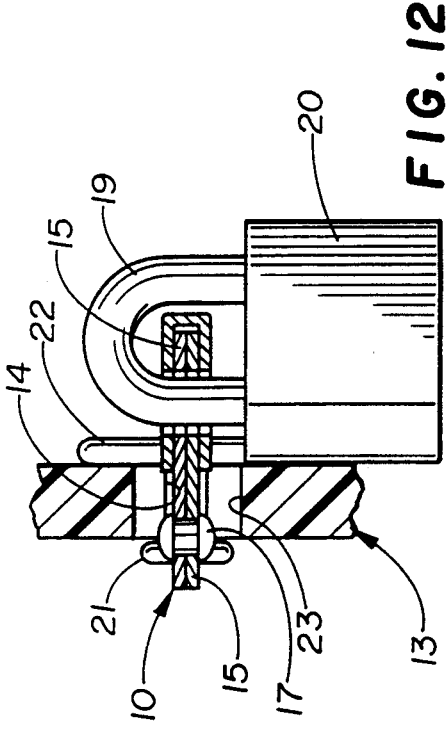
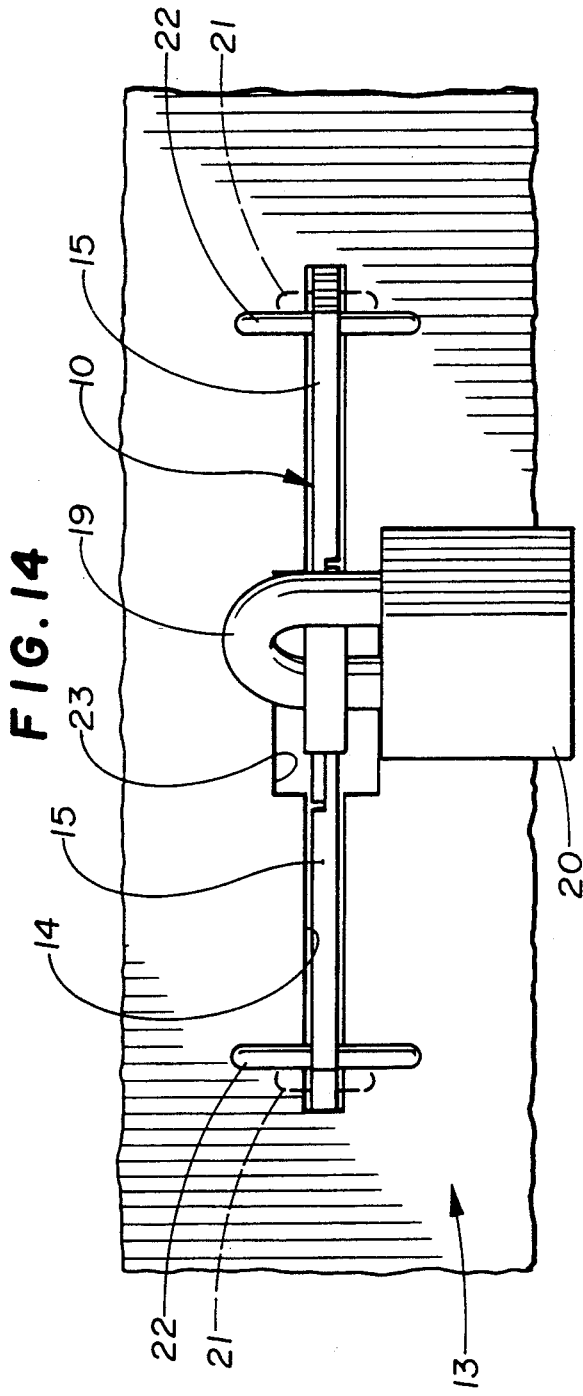

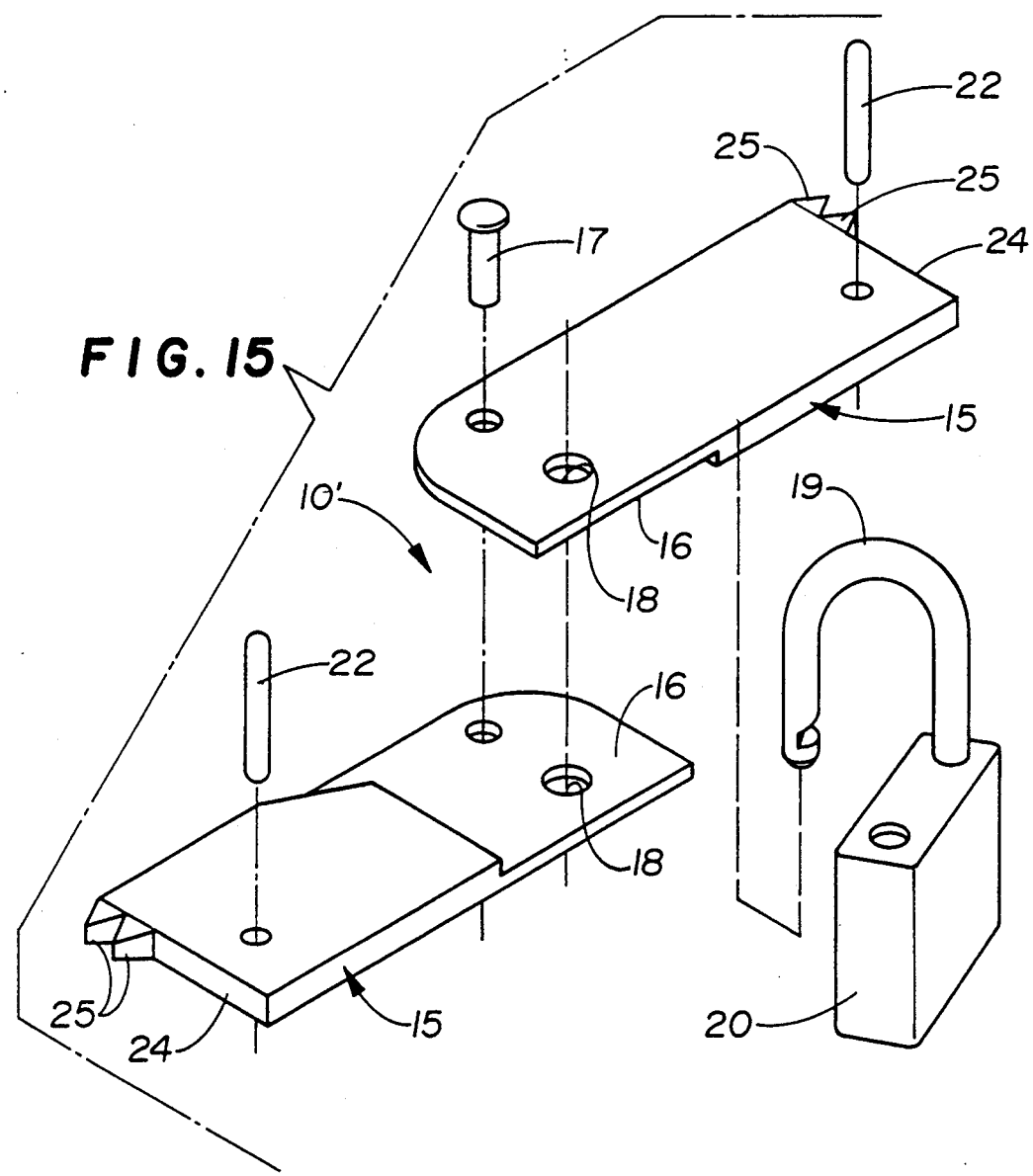
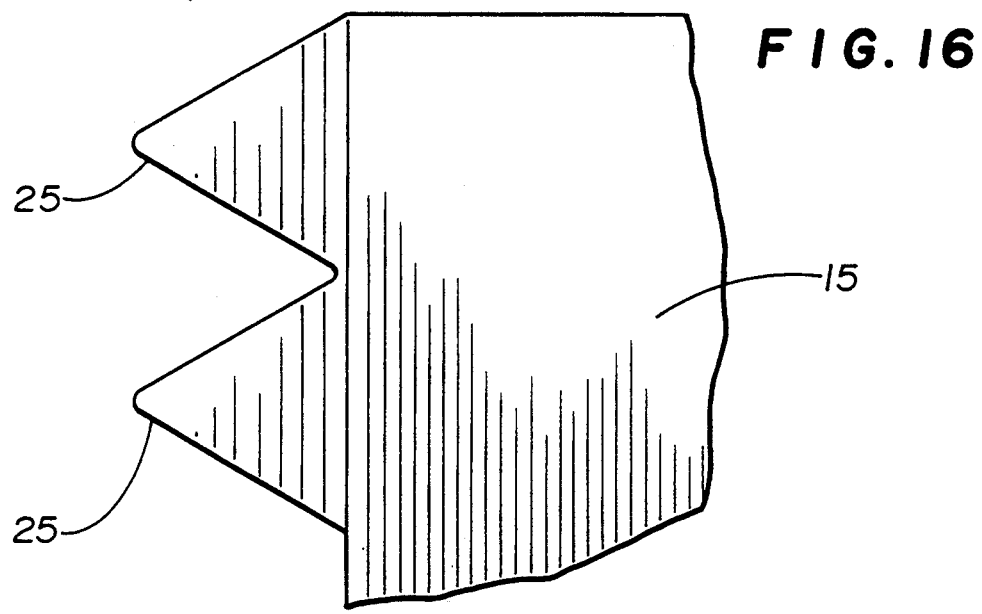

LOCKING DEVICES FOR FLOPPY DISK DRIVES

CROSS REFERENCE TO RELATED APPLICATION

The present invention constitutes a continuation-in-part of application Ser. No. 08/060,608, filed May 11, 1993, the disclosure of which is incorporated by reference herein in its entirety.

FIELD OF THE INVENTION

The present invention relates to computer security and, more particularly, to locking devices for a floppy disk drive in a computer, thereby preventing unauthorized access thereto.

BACKGROUND OF THE INVENTION

An ever-present concern with personal computers ("PC's") and other computer systems is mass-storage (or the lack thereof). New memory-hungry software programs need large amounts of free memory to run properly; and multi-user LAN systems generate reams of data, all of which must be stored. This has generated a huge demand for higher capacity storage, and hard disk drives and other storage devices are quickly evolving to meet that demand. Nevertheless, the amount of data stored in a computer inevitably climbs to capacity.

This creates a two-fold problem. First of all, the stored data often includes personal data or proprietary data essential to a business. For instance, stored mailing lists of customers and vendors, financial data, cost information, payroll records, etc. may be the key to a competitive edge in the marketplace. The sensitivity of such data calls for appropriate security measures to keep the data from getting into the wrong hands. Currently, there is no reliable way to prevent an insider from copying sensitive data onto floppy disks.

Secondly, there is no reliable way to prevent copying from a floppy disk into a computer or system. Users are typically free to download disks onto a computer and, as a result, the amount of free space on the hard disk is quickly consumed by games and other unnecessary data.

Additionally, unauthorized use of a PC could lead to a virus infecting the overall system.

The prior art has resorted to various means and devices in apparent attempts to solve this problem of longstanding. For example, most desktop computers are equipped with keyed power switches. However, this prevents access to the entire computer, rather than access to the disk drive. It is often desirable to allow limited access. For instance, employers need to allow employees to operate their computers, but would rather not allow downloading of proprietary data or uploading of extraneous data. Such data transfer can be prevented by making the disk drive inaccessible.

There have been efforts to devise locking devices for disk drives. For instance, IBM Technical Disclosure Bulletin Volume 30, No. 8 (January, 1988) discloses three keyed locks, all of which employ a swinging arm or shield which is pivoted into position within the disk drive to obstruct the aperture of the drive. Unfortunately, this publication suggests a trade-off between cost and security. The least expensive device suggested by the publication is also the least secure, and it is fairly easy to pry the lock away from the disk drive. The two more effective locks are very complex or must be built into the disk drive as original ("OEM") equipment.

Moreover, IBM Technical Disclosure Bulletin Volume 28, No. 2 (July, 1985) discloses a general concept for a disk drive lock which is based on a keyed retractable bolt. This is a more practical approach, but the details of the retractable bolt are not given; and this device appears to be complicated and not cost-effective.

Additionally, a "FILE-LOK I" and a "FILE-LOK II" are currently available from Qualtec Data Products, Inc. of Fremont, Calif., U.S.A.

The "FILE-LOK I" consists of a small housing permanently attached to the front cover of the floppy disk drive; and a key is inserted into the housing and then turned, thereby lifting a latch (called a "red flag") to block a portion of the aperture in the disk drive through which the floppy disk is normally inserted. This device requires a permanent attachment to the PC, which may be objectionable to some PC owners.

The "FILE-LOK II" consists of a small housing attached to a plastic "card" inserted into the disk drive. Again, a key is inserted into the small housing; and when the key is turned, a latching finger extends upwardly and behind the plastic cover on the front of the disk drive, thereby preventing removal of this device. With this device, however, it may be possible in some cases for a blade to be inserted into the aperture to depress the latching finger sufficiently to enable one to pull the entire device out of the disk drive in the PC, thereby circumventing the device.

Accordingly, and despite these publications and the products currently available on the market, the disclosed devices are not in widespread use; and the need still exists for a locking device for the disk drive of a PC, wherein the locking device is simple, practical, reliable, inexpensive to manufacture, and convenient and easy to use.

SUMMARY OF THE INVENTION

Therefore, it is an object of the present invention to provide a locking device for a PC disk drive, wherein the locking device is simple, practical, reliable, inexpensive to manufacture, and convenient and easy to use.

It is another object of the present invention to provide such a locking device that can be adapted for disk drives of any size or make.

It is still another object to provide such a locking device which is at least tamper-resistant and/or tamper-evident, if not substantially tamper-proof.

It is a further object to provide such a locking device which uses a sturdy and reliable padlock (or combination lock) readily available from a well-known manufacturer.

In accordance with the teachings of the present invention, a locking device is provided for preventing unauthorized access to the disk drive of a computer, such as a PC. The disk drive has an aperture for normal insertion of a floppy disk therein, and this aperture is substantially in a horizontal plane. The locking device includes a pair of articulated members having a first folded position and further having a second expanded position. As a result, the articulated members may be slidably inserted through the aperture in their first folded position and then moved laterally thereof within the plane of the aperture and into their second expanded position. In this second expanded position within the disk drive, a portion of the articulated members extends outwardly of the aperture and is externally-accessible.

An abutment means is carried by the articulated members and engages the disk drive to prevent removal of the articulated members from the disk drive while the articulated members are in their second expanded position therein. A removable locking means is carried by the outwardly-extending portion of the articulated members, externally of the disk drive, and prevents the articulated members from being moved from their second expanded position back into their first folded position. Upon removal of the locking means, the articulated members may be moved from their second expanded position back into their initial folded position; and thereafter, the articulated members may be slidably removed from the aperture in the disk drive.

Preferably, the articulated members include a pair of plates pivotably connected together. Each of these pivoted plates has a hole formed therein; and when the plates are in their expanded position, the holes are in alignment with each other, thereby enabling the shank of a padlock (or combination lock) to be inserted into the aligned holes.

In one embodiment, the abutment means includes respective pairs of spaced-apart pins carried by the pivoted plates and sandwiching the front cover of the disk drive therebetween.

In another (and preferred) embodiment, the abutment means comprises respective teeth on the side edges of the plates. These teeth bite into the spaced-apart side rails in the disk drive, as the plates are pivoted into their expanded position. Preferably, the pivoted plates exhibit an over-the-center camming action which flexes the respective side rails laterally and in respective directions which are opposite to each other.

These and other objects of the present invention will become apparent from a reading of the following specification taken in conjunction with the enclosed drawings.

BRIEF DESCRIPTION OF THE DRAWINGS

FIG. 12 is a cross-sectional view taken along the lines 12—12 of FIG. 9, drawn to an enlarged scale, and showing the conventional padlock in elevation.

FIG. 13 is a further cross-sectional view, taken along the lines 13—13 of FIG. 9, drawn to an enlarged scale, and showing the pins of the locking device engaging the rear and the front, respectively, of the cover or front panel for the disk drive.

FIG. 14 is a front elevational view of the locking device installed in the disk drive.

FIG. 15 is an exploded perspective view, corresponding substantially to that of FIG. 3, but showing a second (and preferred) embodiment of the locking device of the present invention.

FIG. 16 is a partial top plan view, drawn to an enlarged scale, and showing a pair of laterally-projecting teeth formed on one of the pivoted plates of the second embodiment shown in FIG. 15.

FIG. 17 shows the locking device being inserted into the disk drive.

FIG. 18 shows the plates being pivoted into initial engagement with the parallel side rails in the disk drive.

FIG. 19 shows the pivoted plates being fully extended to exert an over-the-center camming action on the side rails, thereby frictionally engaging the side rails and preventing removal of the locking device from the disk drive.

FIG. 20 shows the padlock (or combination lock) connected to the pivoted plates, thereby preventing the plates from being released from their frictional locking engagement with the side rails in the disk drive.

GENERAL DESCRIPTION OF THE PREFERRED EMBODIMENTS

Figure 1:
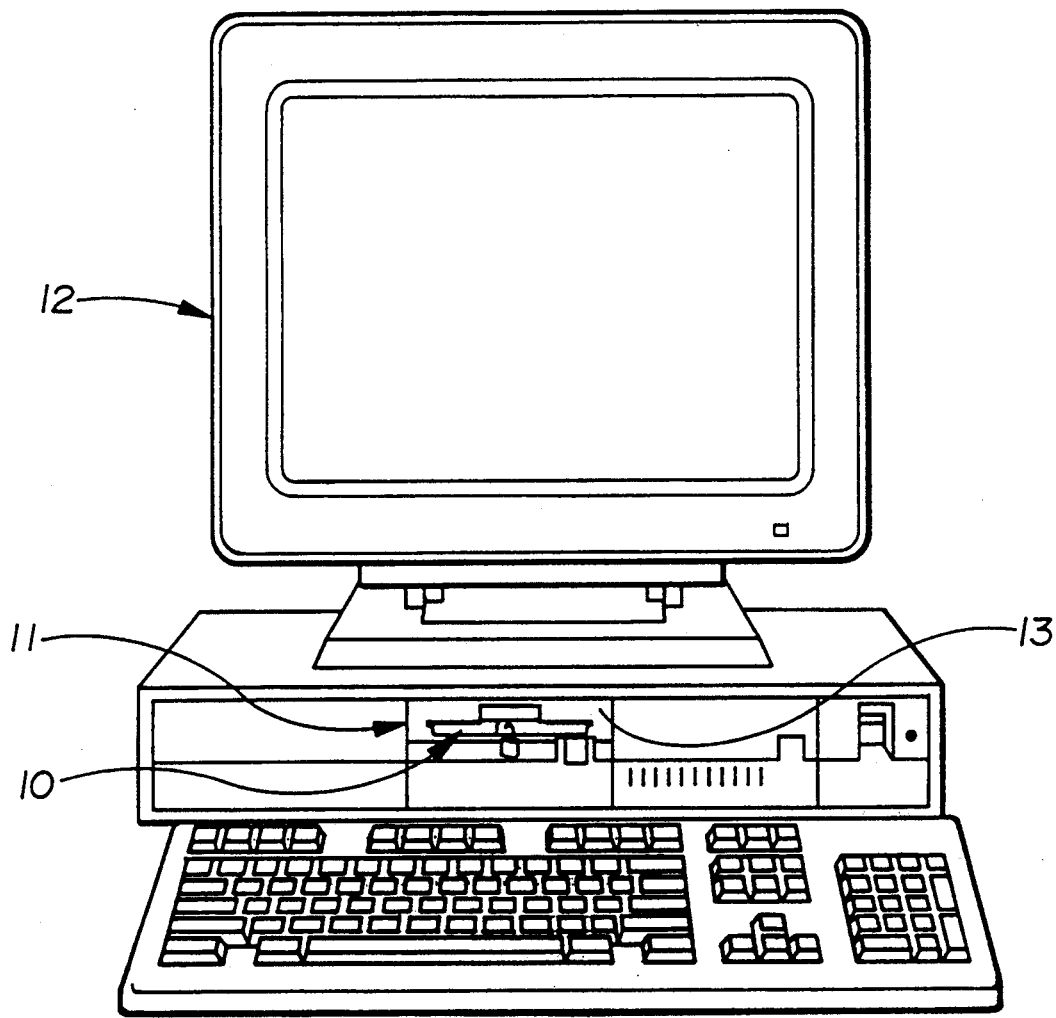
FIG. 1 is a front elevational view of a typical desktop personal computer ("PC") equipped with a first embodiment of the locking device of the present invention.

With reference to FIG. 1, a first embodiment of the locking device 10 of the present invention is installed in the disk drive 11 of a desk-top personal computer ("PC") 12. It will be appreciated by those skilled in the art, however, that the teachings of the present invention are not confined to the PC 12, but are equally applicable to a wide variety of PC's, including laptop and notebook computers.

The disk drive 11 is fairly standard among various manufacturers of PC's and, at the present time, accommodates 3½ inch and 5¼ inch floppy disks. The disk drive 11 has a front cover 13 provided with a slotted (horizontal) aperture 14 through which the conventional floppy disk (not shown) is inserted.

Figure 2:
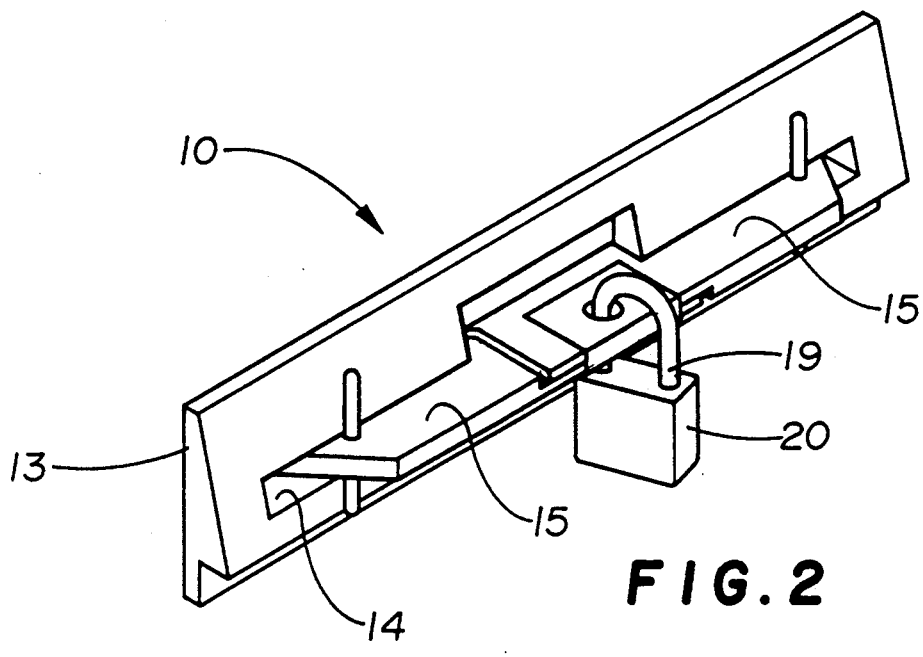
FIG. 2 is a perspective view of the disk drive and the locking device of the present invention, drawn to an enlarged scale.
Figure 3:
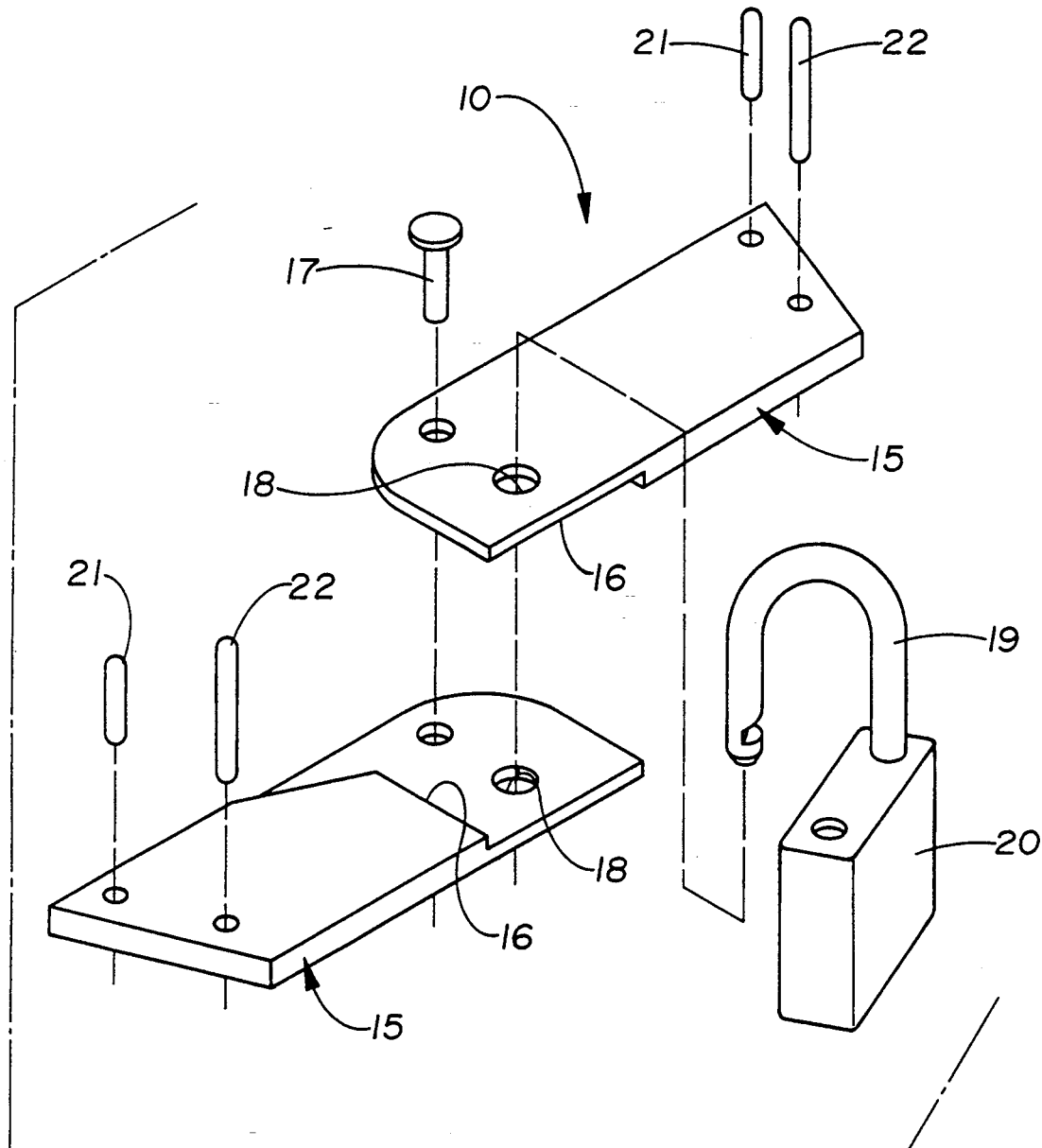
FIG. 3 is an exploded perspective view of the components of the locking device of the present invention.
Figure 4:
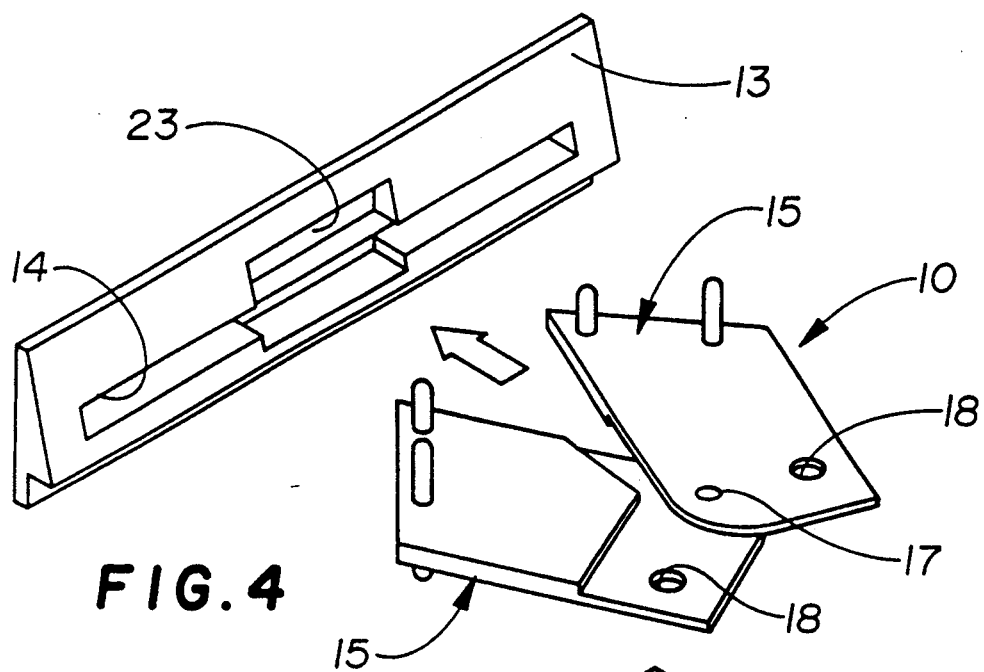
FIGS. 4-6 are pictorial views showing the sequence of inserting the locking device into the aperture in the disk drive and retaining the locking device therein by means of a conventional lock.
Figure 5:
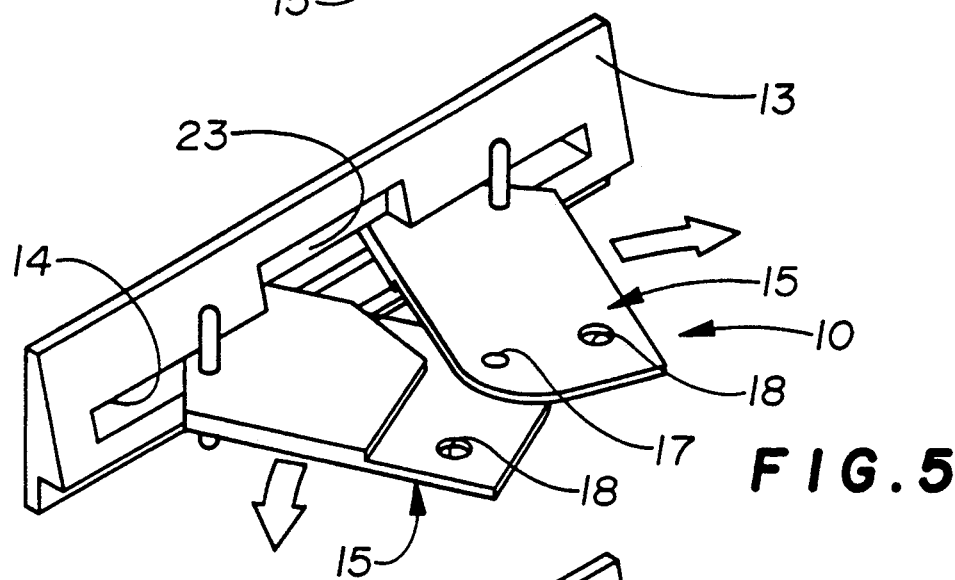
Figure 6:
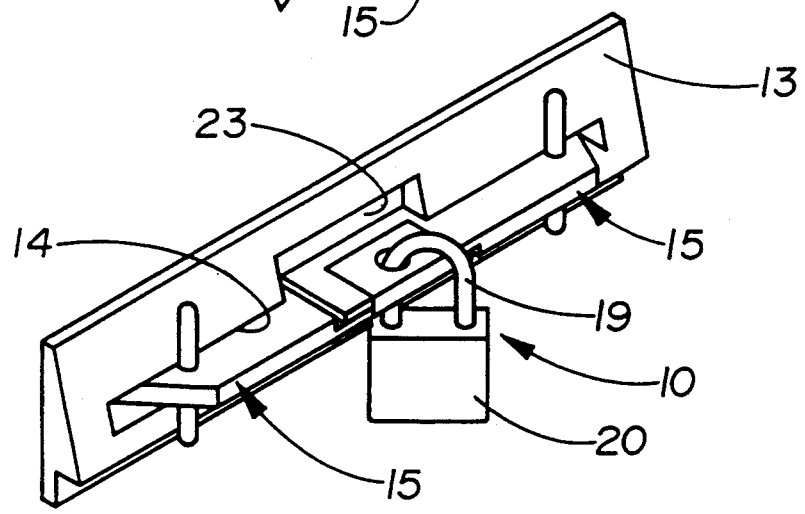
Figure 7:
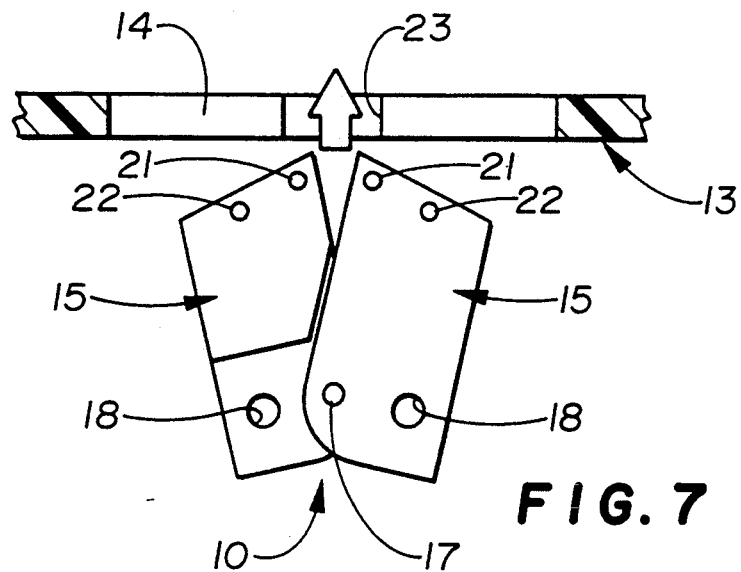
FIGS. 7-9 are sequential top plan views, corresponding substantially to FIGS. 4-6, respectively.
Figure 8:
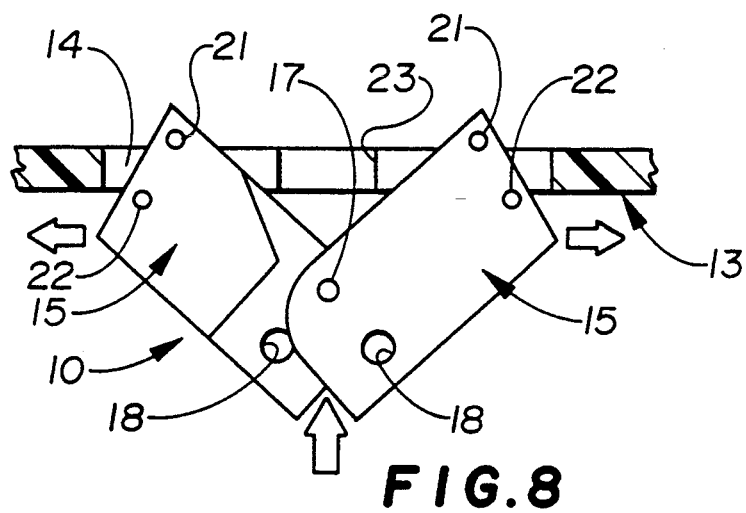

With reference to FIGS. 2 and 3, and with further reference to FIGS. 4-7, the locking device 10 includes a pair of pivoted plates (or equivalent articulated members). Each plate 15 has a relieved or thinner portion 16, such that the plates 15 may nest partially with respect to each other. The plates 15 are connected together for pivotal movement by a rivet 17 (or other suitable fastening means) and each of the plates 15 has a hole 18 formed therein. In the expanded position of the plates 15, wherein the plates 15 are laterally extended substantially opposite to each other, the holes 18 are aligned with each other; and a portion of the plates 15 extends outwardly of the disk drive 11 and is externally accessible.

Accordingly, the shank 19 of a conventional key-operated padlock 20 (or any other suitable locking means, such as a combination lock) may be inserted through the aligned holes 18 to secure the pivoted plates 15 in this laterally-extended position and prevent the plates 15 from being moved back into their partially-nested compressed position. Moreover, each of the plates 15 carries a pair of pins including a relatively-short pin 21 and a relatively-long pin 22 arranged substantially perpendicularly of the plane of the plates 15.

Figure 9:
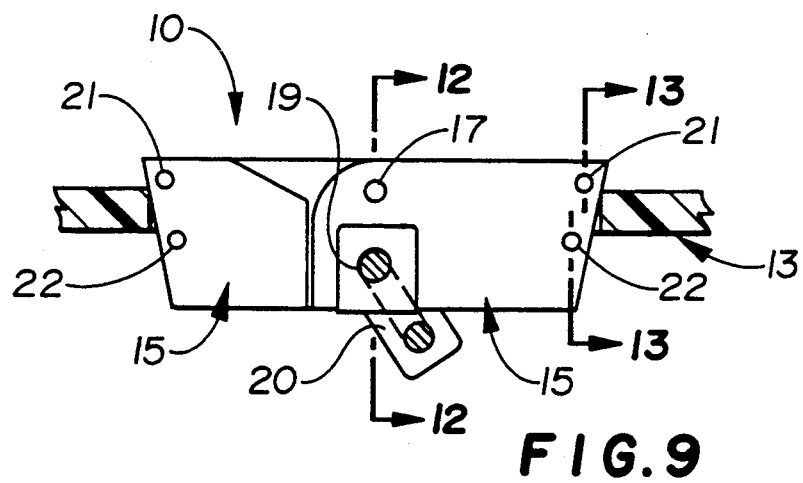
Figure 10:
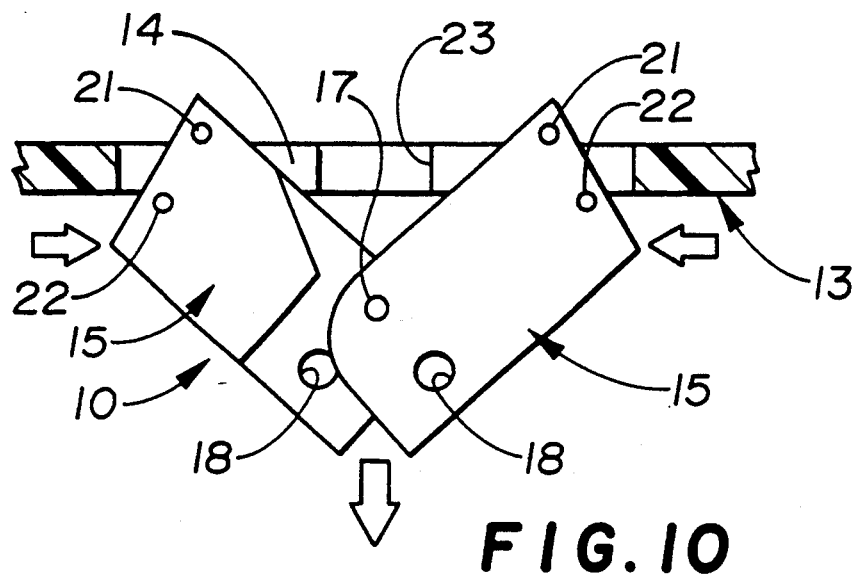
FIG. 10 is a top plan view showing the conventional padlock removed, and further showing the locking device of the present invention being removed from the disk drive.
Figure 11:
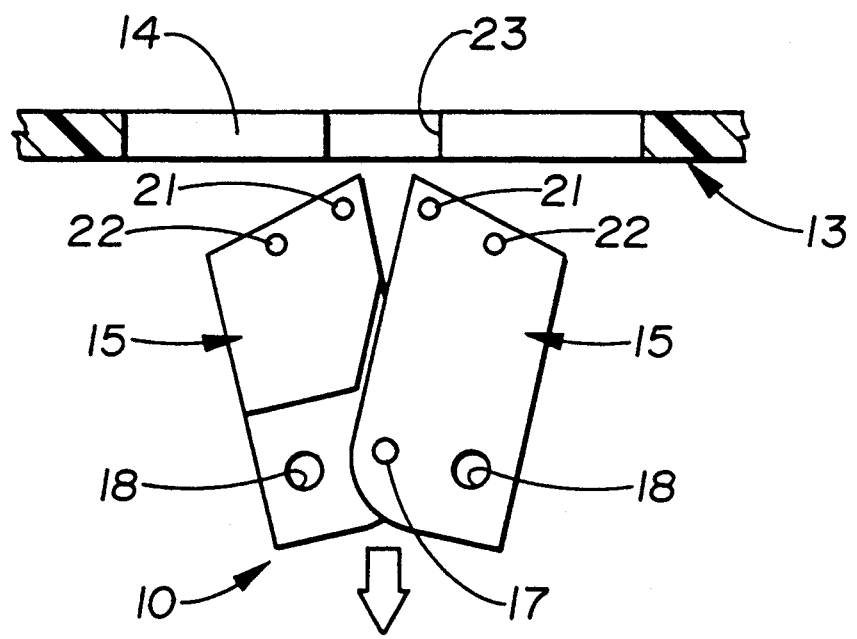
FIG. 11 is a further top plan view, corresponding substantially to FIG. 10, but showing the locking device completely removed.
Figure 17:
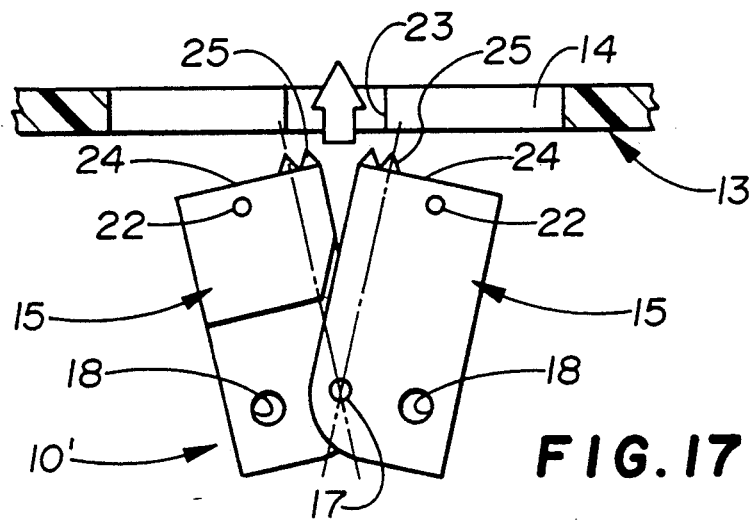
FIGS. 17-20 are sequential pictorial views showing the use of this second embodiment of the locking device of the present invention.
Figure 18:
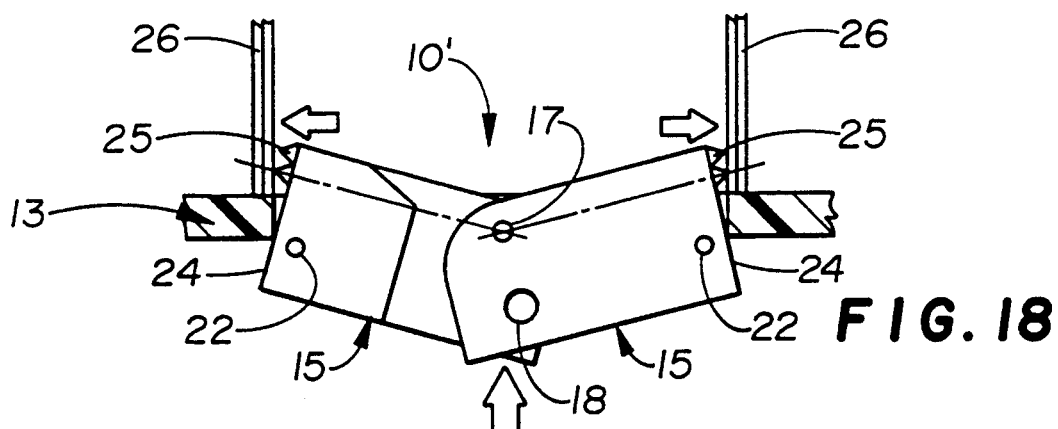

The operation of the locking device 10 of the present invention will be readily appreciated with reference to FIGS. 4-14. The plates 15 have a first folded or partially nested position (FIGS. 4 and 7) which allows the plates 15 to be inserted through the aperture 14 in the front cover 13 of the disk drive 11. The short pins 21 clear the restricted portion 23 of the aperture 14 (FIG. 7) to allow the plates 15 to expand (FIG. 8) into their fully-extended position (FIG. 9). In this extended position, the two short pins 21 on the respective plates 15 are behind the front cover 13, and the two long pins 22 are in front of the front cover 13 (FIGS. 13 and 14) such that the front cover 13 is "sandwiched" between the pairs of spaced-apart pins 21 and 22, respectively. The plates 15 are thus maintained in their expanded (locked) position by the padlock 20 (FIGS. 12 and 13). Thereafter, when the padlock 20 is removed, the plates 15 may again be pivoted (FIG. 10) and removed (FIG. 11).

Insertion of the locking device 10 of the present invention (and its subsequent removal) is quick, easy and convenient; and no special tools or manual dexterity is required.

An alternate (and preferred) embodiment 10' of the invention is illustrated in FIGS. 15-20. There, identical numbers have been used to designate the parts which are identical to, or substantially identical to, the parts of the first embodiment 10 of FIGS. 1-14. However, the operation of this alternate embodiment 10' is different.

Figure 19:
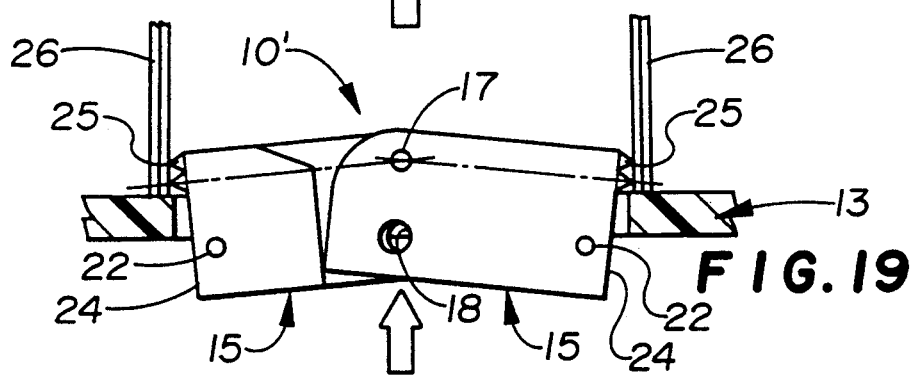

The pivoted plates 15 have respective side edges 24 (remote from the pivot point of the rivet 17) which are provided with at least one (and preferably a pair of) laterally-projecting teeth 25. These teeth 25 (or equivalent abutment means) engage the respective spaced-apart side rails 26 in the disk drive (FIG. 18) when the plates 15 are being pivoted into their expanded position. Thereafter, when the plates 15 are fully expanded, the plates 15 have an over-the-center camming action, such that the teeth 25 on the plates 15 frictionally engage the respective side rails 26 (FIG. 19).

Figure 20:
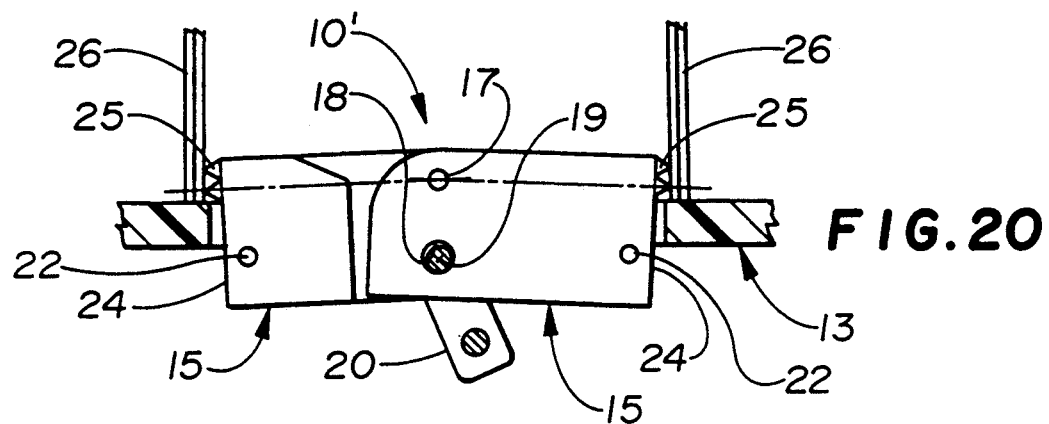

As the plates 15 of the locking device 10' are rigidly secured and frictionally locked within the disk drive 11, the padlock 20 (or its equivalent) maintains the locking device 10' rigidly secured and frictionally locked within the disk drive 11 as shown more clearly in FIG. 20. Once the padlock 20 is removed, however, the plates 15 may be again pivoted towards their initial folded position, releasing the frictional lock between the teeth 25 and the rails 26, and facilitating the complete removal of the locking device 10' from the disk drive 11 in a manner substantially identical to the first embodiment 10 of the invention.

Figure 21:
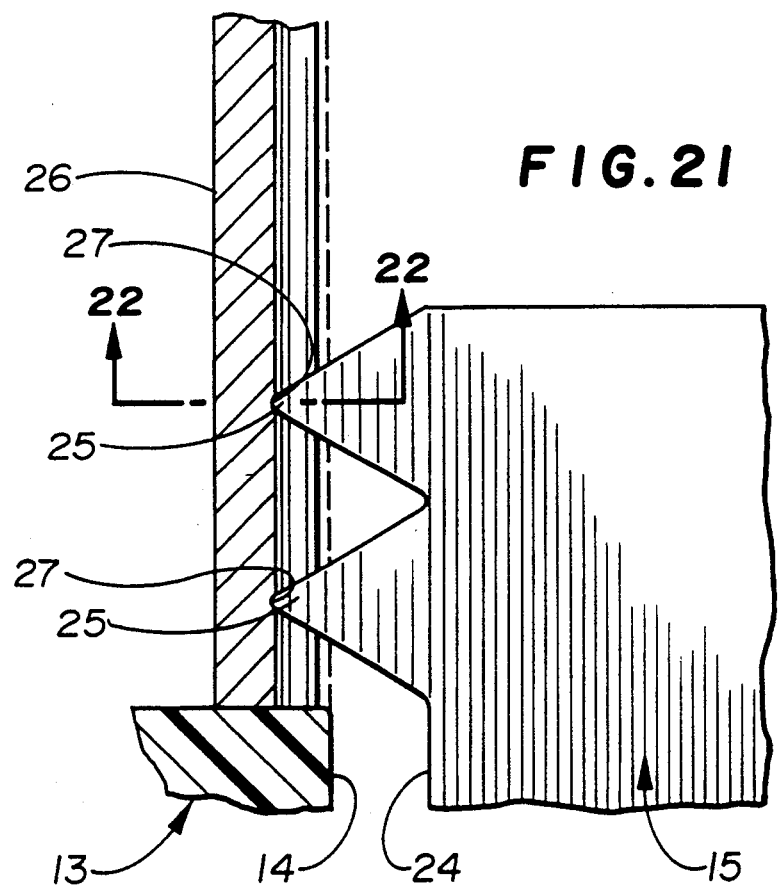
FIG. 21 is a partial top plan view, drawn to an enlarged scale, and showing a pair of laterally-projecting teeth on one of the plates engaging the trough in a respective side rail.
Figure 22:
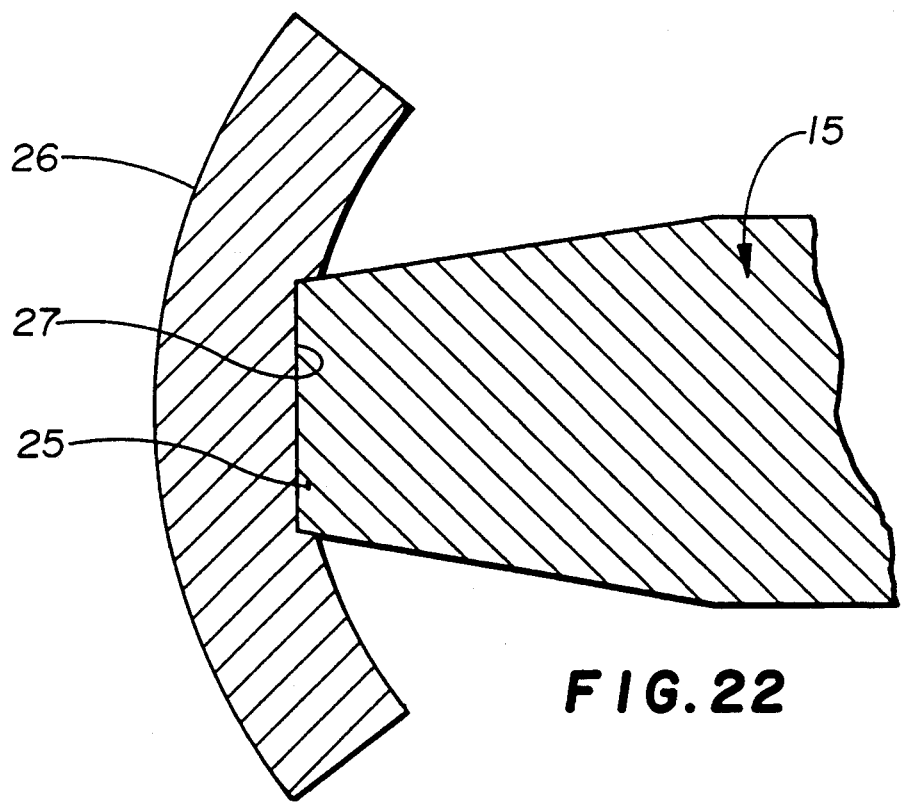
FIG. 22 is a cross-sectional view thereof, taken along the lines 22—22 of FIG. 21, and showing how the teeth will tend to "bite" into the side rail, especially after repeated use, to form an indentation or detent pocket therein.
Figure 23:
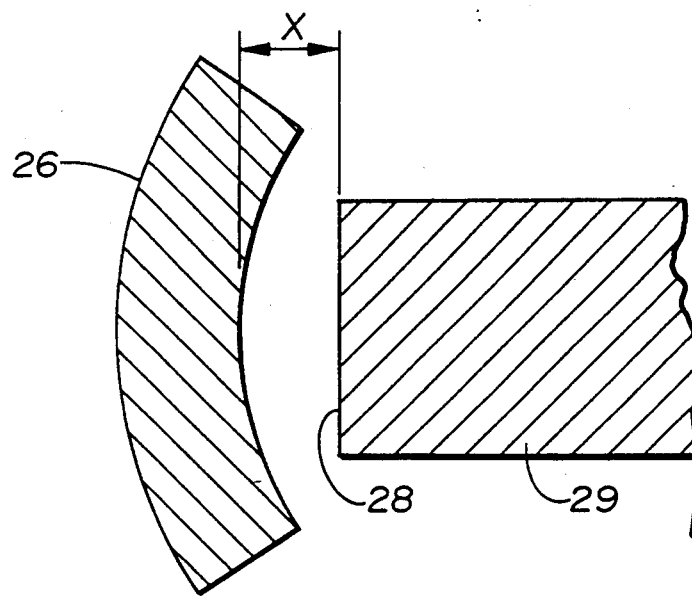
FIG. 23 is a schematic view of one of the rails in exploded relationship to a floppy disk, showing how some computer manufacturers will have a maximum degree of dimensional clearance between the side edge of the floppy disk and the respective side rail.
Figure 24:
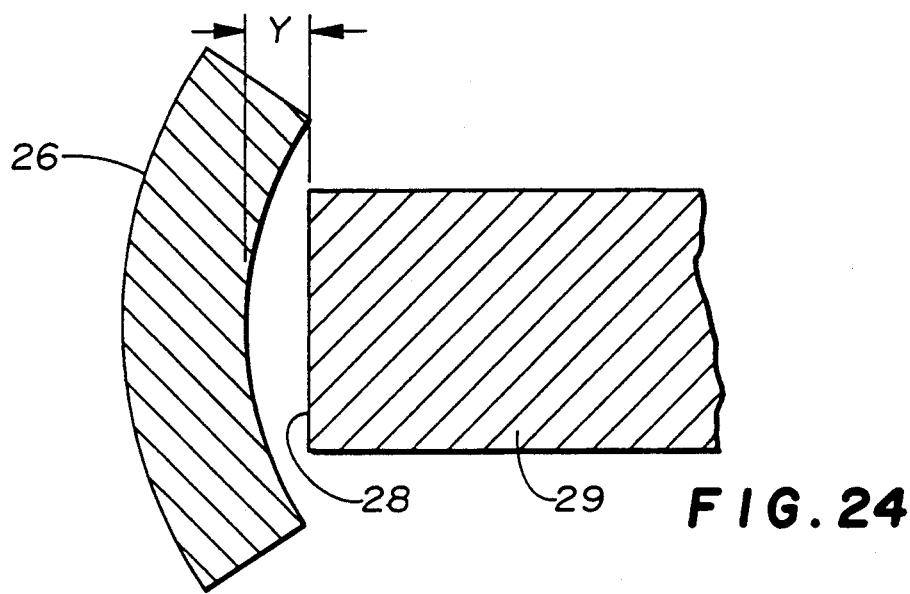
FIG. 24 is a further schematic view, corresponding substantially to that of FIG. 23, but showing how other manufacturers will provide a minimum degree of dimensional clearance between the side edge of the floppy disk and the respective side rail.
Figure 25:
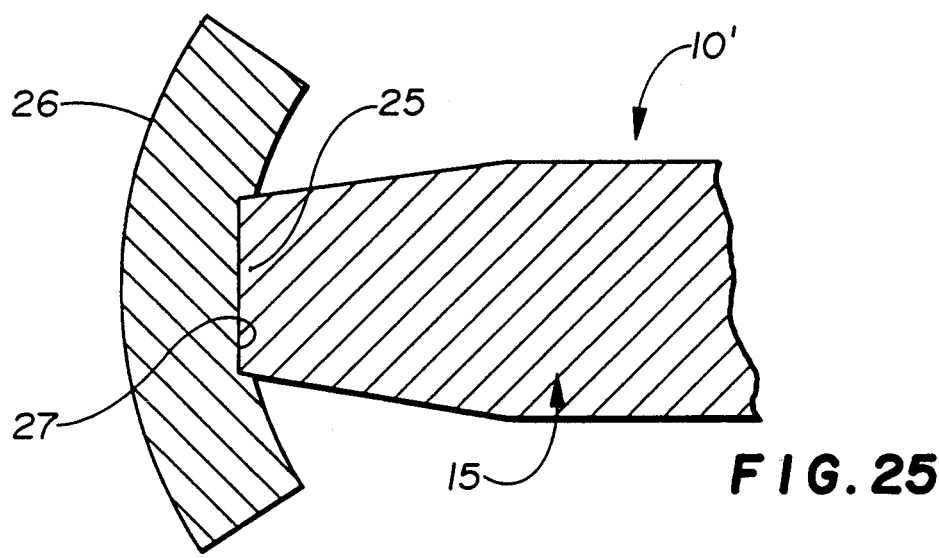
FIG. 25 is a further schematic view, corresponding substantially to FIGS. 23 and 24, but showing the floppy disk removed, and further showing how the over-the-center camming action of the pivoted plates accommodates dimensional variations as well as tolerance accumulations in the floppy disks and the floppy disk drives of various manufacturers.

With reference to FIGS. 21 and 22, the teeth 25 are preferably in the form of "saw" teeth (as shown) although it will be appreciated by those skilled in the art that any form of teeth —or suitable laterally-extending abutment means that frictionally engages the respective side rails 26—may be employed, consonant with the teachings of the present invention. With this in mind, the teeth 25 tend to "bite" into the respective side rails 26 and to make a slight indentation or pocket 27 therein (FIG. 22) especially with repeated use of the locking device 10' on a particular PC 12.

With reference to FIGS. 23-26, another feature of the present invention is its universality; that is, the locking device 10' will readily accommodate disk drives 11 and PC's 12 of different manufacturers. Some manufacturers will provide a maximum degree of dimensional clearance (denoted by X in FIG. 23) between the side rail 26 and the side edge 28 of the housing for the floppy disk 29 while others will provide a minimum degree of dimensional clearance (denoted by Y in FIG. 24). Typically, X may be approximately 0.050 of an inch, while Y may be approximately 0.020 of an inch. The intended dimensional clearance between the floppy disk 29 and the adjacent side rail 26 is not critical, nor are the tolerance accumulations therebetween, just as long as the floppy disk 29 has sufficient clearance to be received within the disk drive 11 and to be slidably guided therein by the spaced-apart side rails 26. In any event, the teeth 25 will bite into the respective side rail 26 as shown in cross-section in FIG. 25.

Figure 26:
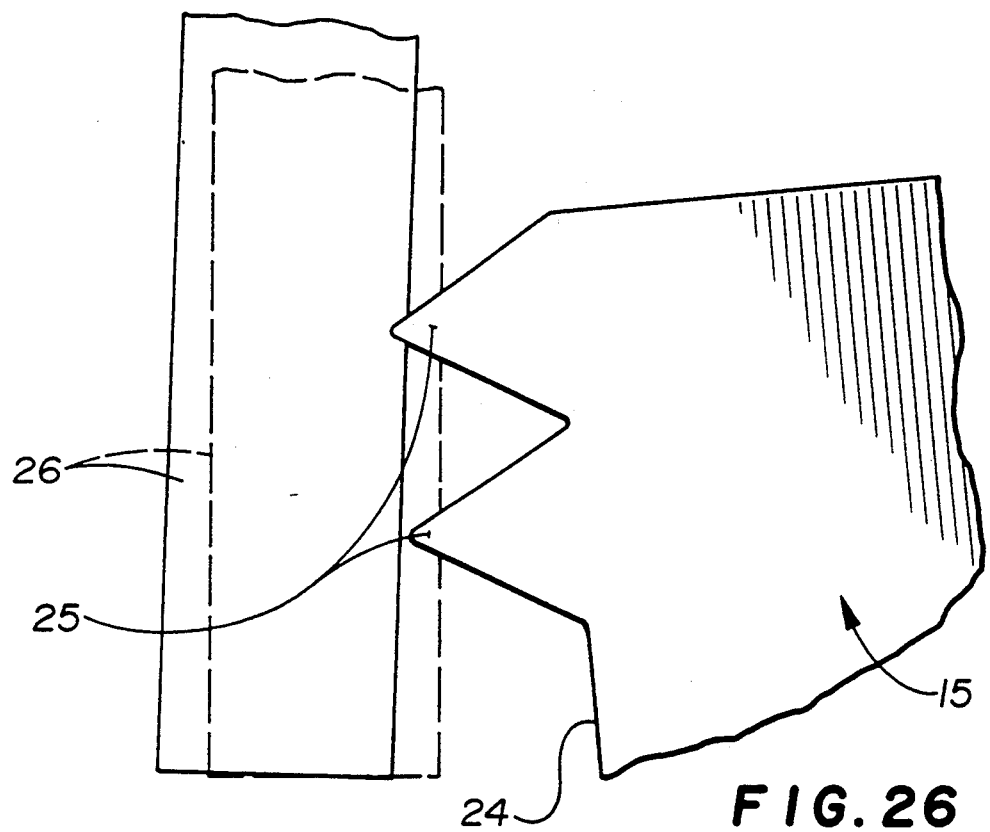
FIG. 26 is a schematic plan view of a maximum dimensional clearance between the rails (FIG. 24), showing how one of the pivoting plates flexes the respective rail outwardly (the degree of flexing being exaggerated for illustration purposes).
Figure 27:
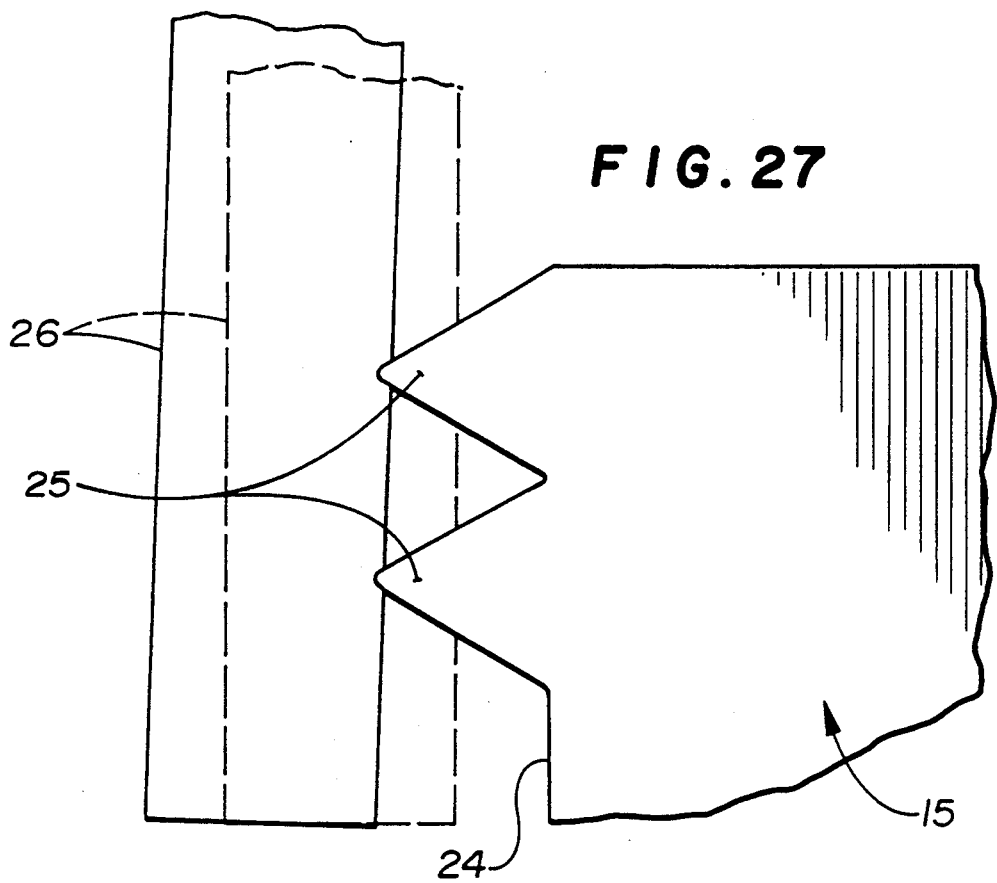
FIG. 27 is a further schematic plan view, corresponding substantially to FIG. 26, but showing a minimum dimensional clearance, and, correspondingly, a greater degree of flexing of the respective side rail.

This universal feature of the locking device 10' is further illustrated in FIGS. 26 and 27. In FIG. 26, the rail 26 is initially spaced further from the locking device 10' (maximum dimensional clearance) than in FIG. 27 (minimum dimensional clearance). The pivoted plates 15 of the locking device 10' will expand to frictionally engage the side rails 26 and flex the rails 26 laterally apart by a slight amount (exaggerated in FIGS. 26 and 27 for illustration purposes). In FIG. 27, the plates 15 have been flexed or extended more than in FIG. 26; in each case, however, the locking device 10' is rigidly clamped between the rails 26, frictionally engaging the rails 26, and cannot be removed without first removing the padlock 20. Once removed, the rails 26 will return to their original position as shown by the broken lines in FIGS. 26 and 27.

The locking device 10' exhibits an over-the-camming action on the rails 26 and, as a result, the locking device 10' is universal for a variety of disk drives 11 and PC's 12. Moreover, the locking device 10' does not rely on the rigidity of the front cover 13 (usually a plastic part) and its mounting on the PC 12, as is otherwise required with the locking device 10 in the first embodiment of the invention (as well as a number of the prior art devices previously noted).

The locking device 10' is provided with the frictional gripping teeth 25 and the pair of long pins 22. The long pins 22 are on the outside of the front cover 13 and prevent the pivoted plates 15 from being inserted too far, inadvertently, into the aperture 14 in the disk drive 11. Moreover, the long pins 22 provide a positioning of the pivoted plates 15 with respect to the disk drive 11 so that the teeth 25 on the plates 15 easily and quickly engage the indented pockets 27 on the respective side rails 26.

Figure 28:
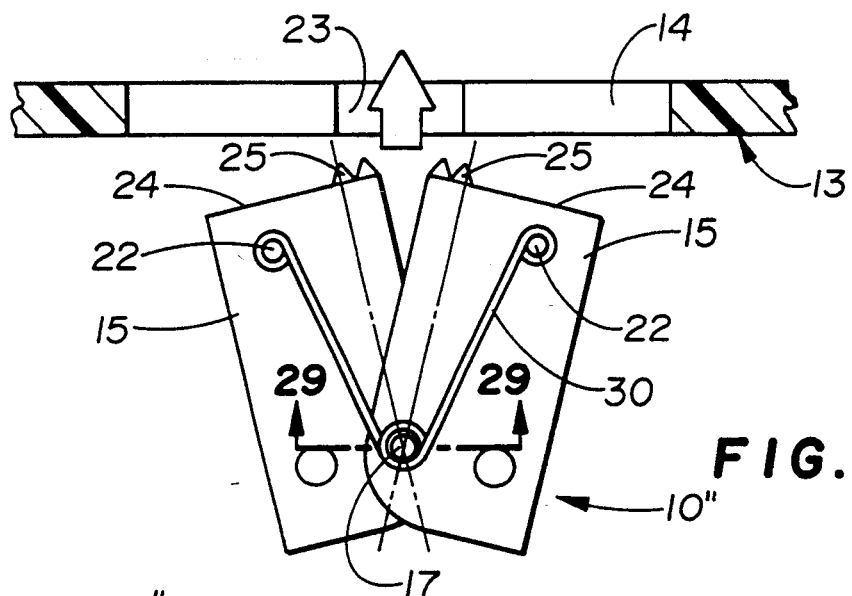
FIG. 28 is a top plan view of a further embodiment, constituting a combination of the two previous embodiments, together with a torsion spring between the two pivoted plates.

With reference to FIG. 28, a torsion spring 30 may have its center portion mounted on the rivet 17 (between the pivoted plates 15) and its ends mounted on the respective long pins 22 (if desired). The spring 30 will continually resiliently bias the pivoted plates 15 towards their expanded position (much like a spring-loaded clothespin) so that the plates 15 may be pushed together into their folded nested position against the force of the spring 30, inserted into the aperture 14 in the disk drive 11, and then released into their expanded frictional-locking position (as previously described herein).

Figure 29:
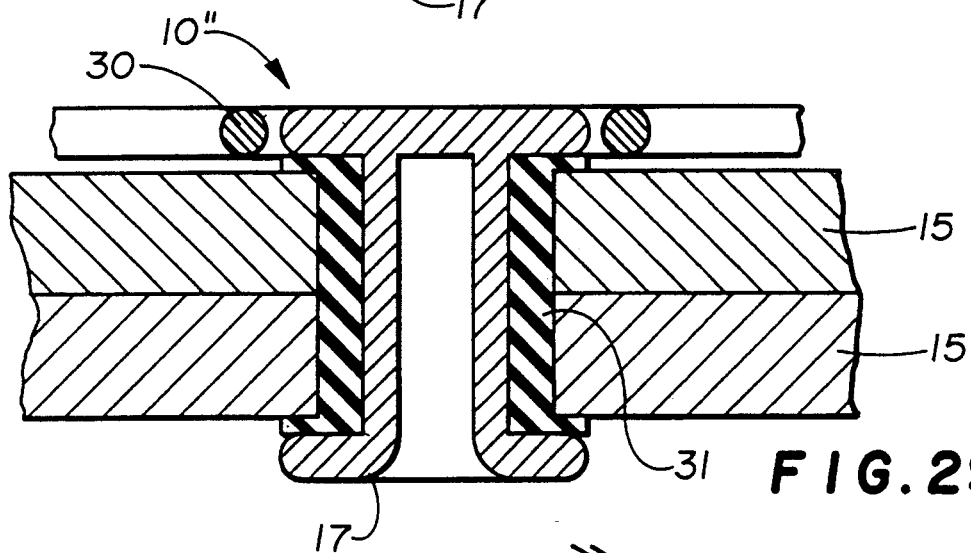
FIG. 29 is a cross-sectional view, taken along the lines 29—29 of FIG. 28 and drawn to an enlarged scale, and showing an elastomeric grommet or bushing between the rivet and the pair of plates at the pivot point thereof, thereby taking up dimensional variations and tolerance accumulations.

In this embodiment 10", the dimensional differences and the tolerance accumulations are accommodated, first, by the outward flexing of the side rails 26 and, second, by a resilient elastomeric grommet or bushing 31 between the pivoted plates 15 and the rivet 17, as shown more clearly in FIG. 29.

Figure 30:
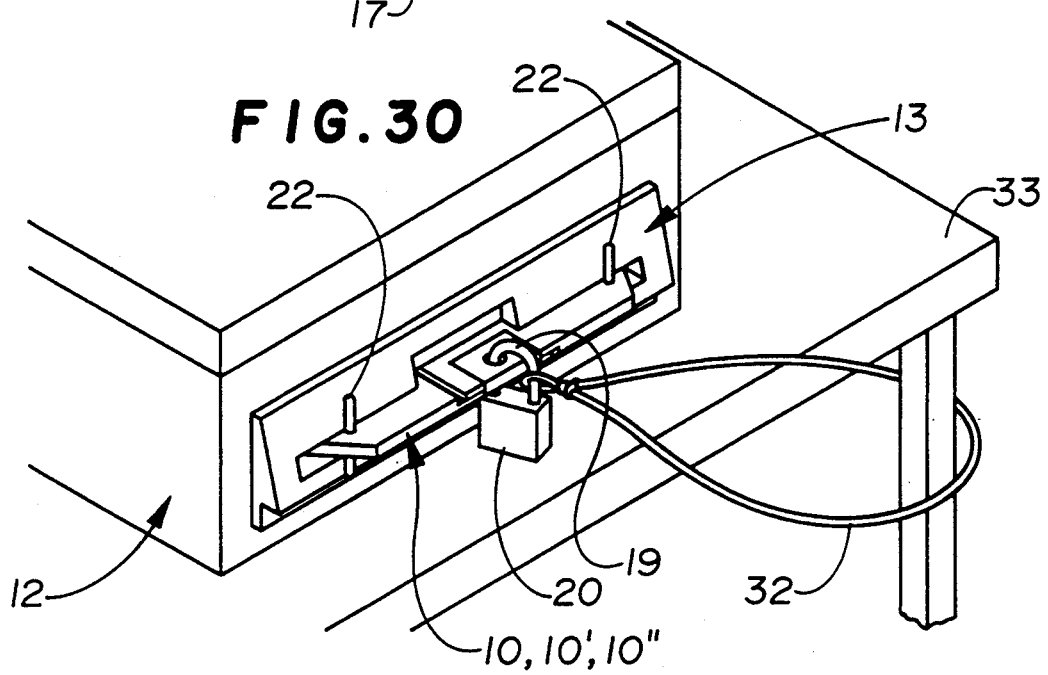
FIG. 30 is a pictorial view, showing how the locking device of the present invention may be attached to a cable or chain secured to a desk, table or fixture.

With reference to FIG. 30, a chain or cable 32 may be used in conjunction with the locking devices 10, 10' and 10" and the other end of the cable 32 may be secured to a desk, table, floor or other fixture (illustrated diagrammatically at 33) to prevent a complete removal of the PC 12.

Thus, it will be appreciated that the present invention provides simple, practical and secure locking devices 10, 10' and 10" which are tamper-evident or tamper-resistant, if not tamper-proof. The locking devices 10, 10' and 10" are easy, quick and convenient to use, either in their initial installation within the PC 12 or their subsequent removal therefrom. The locking devices 10, 10' and 10" protect against unauthorized use of the PC 12 and possible loss of confidential data and proprietary information. Besides, unauthorized use of the PC 12 may use up valuable storage capacity with extraneous information (such as a video game) and, under certain circumstances, may result in a virus inadvertently infecting the system and wiping out the stored data or otherwise affecting the software program. Moreover, the locking devices 10, 10' and 10" may be made economically for widespread marketing and distribution. Presently, there are 60,000,000 PC's in the United States, representing approximately 75% of the worldwide total, and the vast majority of these PC's are not being protected against unauthorized use.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A removable lock inserted into the disk drive of a personal computer, comprising a pair of plates, pivot means for pivoting the plates together, such that the plates have a folded position for insertion of the plates into the disk drive, and such that the plates thereafter have an expanded position within the disk drive, abutment means carried by the plates and engaging the disk drive in the expanded position of the plates, and removable means for maintaining the plates in their expanded position in the disk drive and preventing the removal therefrom, wherein the plates have an over-the-center camming action when moved from their folded position into their expanded position within the disk drive.

2. In combination with the disk drive of a personal computer, wherein the disk drive has an aperture and further has a pair of spaced-apart side rails for insertion of a floppy disk therein, a removable lock comprising a pair of members pivotably connected together about a pivot, such that the lock has a folded position in which the members are pivoted towards each other and further has an expanded position in which the members are pivotably extended away from each other, each of the members having a side edge remote from the pivot, and each of the side edges of the members having respective abutment means extending laterally therefrom, such that the members in their folded position are inserted through the aperture and pushed into the disk drive in the personal computer, and such that the members thereafter are pivoted into their expanded position, whereby the laterally-extending abutment means on the respective side edges of the members engage the side rails, respectively, thereby rigidly securing the members within the disk drive, the members having an externally-accessible portion extending outwardly of the disk drive when the members are secured within the disk drive, and removable locking means carried by the externally-accessible portion of the respective members.

3. The combination of claim 2, wherein the externally-accessible portion of the members comprises respective overlapping portions having respective holes formed therein, the holes aligning with each other in the expanded position of the members, and wherein the removable locking means comprises a padlock received in the aligned holes in the respective members.

4. In combination with the disk drive of a personal computer, wherein the disk drive has an aperture and further has a pair of spaced-apart side rails for insertion of a floppy disk therein, a removable lock comprising a pair of members pivotably connected together about a pivot, such that the lock has a folded position in which the members are pivoted towards each other and further has an expanded position in which the members are pivotably extended away from each other, each of the members having a side edge remote from the pivot, and each of the side edges of the members having respective abutment means extending laterally therefrom, such that the members in their folded position are inserted through the aperture and pushed into the disk drive in the personal computer, and such that the members thereafter are pivoted into their expanded position, whereby the laterally-extending abutment means on the respective side edges of the members engage the side rails, respectively, thereby rigidly securing the members within the disk drive, the members having an externally-accessible portion extending outwardly of the disk drive when the members are secured within the disk drive, and removable locking means carried by the externally-accessible portion of the respective members, wherein the members in their expanded position have an over-the-center camming action which flexes the respective side rails laterally and in respective directions which are opposite to each other.

5. In combination with the disk drive of a personal computer, wherein the disk drive has an aperture and further has a pair of spaced-apart side rails for insertion of a floppy disk therein, a removable lock comprising a pair of members pivotably connected together about a pivot, such that the lock has a folded position in which the members are pivoted towards each other and further has an expanded position in which the members are pivotably extended away from each other, each of the members having a side edge remote from the pivot, and each of the side edges of the members having respective abutment means extending laterally therefrom, such that the members in their folded position are inserted through the aperture and pushed into the disk drive in the personal computer, and such that the members thereafter are pivoted into their expanded position, whereby the laterally-extending abutment means on the respective side edges of the members engage the side rails, respectively, thereby rigidly securing the members within the disk drive, the members having an externally-accessible portion extending outwardly of the disk drive when the members are secured within the disk drive, and removable locking means carried by the externally-accessible portion of the respective members, wherein the abutment means on the respective side edge of each member comprises a pair of teeth which bite into the respective rail, thereby tending to form an indentation therein.

6. In combination with the disk drive of a personal computer, wherein the disk drive has an aperture and further has a pair of spaced-apart side rails for insertion of a floppy disk therein, a removable lock comprising a pair of plates pivotably connected together about a pivot, such that the lock has a folded position in which the plates are pivoted towards each other and further has an expanded position in which the plates are pivotably extended away from each other, each of the plates having a relieved portion, such that the plates may be pivotably nested with respect to each other in the folded position of the plates, each of the plates further having a side edge remote from the pivot, and each of the side edges of the plates having at least one tooth extending laterally therefrom, such that the plates in their folded position are inserted through the aperture and pushed into the disk drive in the personal computer, and such that the plates thereafter are pivoted into their expanded position, whereby the laterally-extending teeth on the respective side edges of the plates frictionally engage the side rails, respectively, as the plates exhibit an over-the-center camming action, thereby frictionally locking the plates in their expanded position within the disk drive, and means for maintaining the plates in their frictionally-locked expanded position within the disk drive.

7. The combination of claim 6, wherein said last-named means comprises each of the plates having a hole formed therein, the holes being aligned with each other in the expanded position of the plates, and a padlock having a shank received in the aligned holes.

8. The combination of claim 6, further including an elastomeric bushing at the pivot between the plates, thereby facilitating the over-the-center camming action and accommodating dimensional variations and tolerance accumulations in the disk drive.

9. A removable lock inserted into the disk drive of a personal computer, comprising a pair of plates, pivot means for pivoting the plates together, such that the plates have a folded position for insertion of the plates into the disk drive, and such that the plates thereafter have an expanded position within the disk drive, the plates being inserted into the disk drive in a given direction, means including a pair of pins, one each carried by a respective pivoted plate, for limiting the insertion of the plates into the disk drive, abutment means carried by the plates and engaging the disk drive in the expanded position of the plates, the abutment means exerting a retention force which is substantially perpendicular to the direction in which the plates are inserted into the disk drive, and removable means for maintaining the plates in their expanded position in the disk drive and preventing the removal therefrom, the removable means including a removable lock, and the plates having respective holes registering with each other in the expanded position of the plates and aligned with the pivot means in the direction in which the plates are inserted within the disk drive.

10. The removable lock of claim 9, wherein the pivot means comprises a rivet between the plates, and wherein an elastomeric bushing is disposed between the rivet and the plates.

11. The removable lock of claim 9, wherein each of the plates has a relieved portion, such that the plates are partially nested in their folded position.

12. A removable lock inserted into the disk drive of a personal computer comprising a pair of plates, pivot means for pivoting the plates together, such that the plates have a folded position for insertion of the plates into the disk drive, and such that the plates thereafter have an expanded position within the disk drive, abutment means carried by the plates and engaging the disk drive in the expanded position of the plates, and removable means for maintaining the plates in their expanded position in the disk drive and preventing the removal therefrom, wherein the disk drive has a front cover, and wherein the abutment means comprises two pairs of spaced-apart pins carried by the respective plates perpendicularly thereof, the front cover of the disk drive being sandwiched between the pins in the expanded position of the plates.

13. A removable lock inserted into the disk drive of a personal computer, comprising a pair of plates, pivot means for pivoting the plates together, such that the plates have a folded position for insertion of the plates into the disk drive, and such that the plates thereafter have an expanded position within the disk drive, abutment means carried by the plates and engaging the disk drive in the expanded position of the plates, and removable means for maintaining the plates in their expanded position in the disk drive and preventing the removal therefrom, wherein the disk drive has a pair of side rails, and wherein the abutment means comprises laterally-projecting teeth carried by the respective plates and engaging the side rails, respectively.

14. The removable lock of claim 13, wherein the disk drive has a front cover, and wherein a pair of spaced-apart pins is carried by the respective plates and engages the front cover of the disk drive, thereby limiting the insertion of the plates into the disk drive.

15. A removable lock inserted into the disk drive of a personal computer, comprising a pair of plates, pivot means for pivoting the plates together, such that the plates have a folded position for insertion of the plates into the disk drive, and such that the plates thereafter have an expanded position within the disk drive, abutment means carried by the plates and engaging the disk drive in the expanded position of the plates, and removable means for maintaining the plates in their expanded position in the disk drive and preventing the removal therefrom, further including a torsion spring carried by the pivoted plates for constantly urging the plates towards their expanded position.

* * * * *